INVENTORS.
RICHARD W. SCHUTTE
CLIFFORD J. ROBERTS, JR
BY
ATTORNEY 3,530,023
LAMINATED SHEET MATERIAL AND METHODS
OF MAKING SUCH MATERIAL
Richard W. Schutte, Newton Square, Pa., and Clifford
J. Roberts, Jr., Blackwood, N.J., assignors to Scott
Paper Company, Philadelphia, Pa., a corporation of
Pennsylvania
Filed Aug. 25, 1965, Ser. No. 482,567
Int. Cl. B32b 31/00
U.S. Cl. 156—290                                    2 Claims

ABSTRACT OF THE DISCLOSURE

Laminated sheet material comprising at least two adjacent layers of cellulosic fiber sheet material secured together at a plurality of spaced points by heat and pressure without the addition of any adhesive material. Material of the type described above including at least one inner layer of thermoplastic material providing a waterproof film or barrier flanked by adjacent absorbent layers. Methods for forming the above materials.

This invention relates to laminated sheet material and methods of making such material, and more particularly, to laminated sheet material which is comprised of cellulosic sheets and which may include layer of thermoplastic material.

The material formed by the method of the invention is characterized by the fact that it is strong, absorbent, and flexible, and in at least one embodiment is moisture-proof and yet possesses high surface absorbency. It may be adapted for many uses such as napkins, tablecloths, bibs, aprons or other protective garments, disposable bedclothes, etc. It has prime importance in instances such as the above and other applications where low cost is extremely important such as where an article must be disposed of after a relatively short period of use. It is believed that a laminated sheet material constructed in accordance with the invention provides a combination of the highest strength, flexibility, and absorbency of any similar material with respect to the cost thereof.

In one embodiment, laminated sheet material of the invention comprises at least two adjacent layers of cellulosic fiber sheet material secured together at a plurality of spaced points by heat and pressure without the addition of any adhesive material.

In another embodiment, laminated sheet material of the invention comprises a plurality of layers of cellulosic fiber sheet material divided by at least one inner layer of a thermoplastic material, providing a waterproof film or barrier flanked by adjacent adsorbent layers, all of these layers being secured at spaced points so as to maintain a fixed arrangement between the sheets. The material may be bonded together in such a way as to form attractive texture effects or the lamination or bonding may be accomplished so that quilting and designs may be incorporated therein, as by bonding the layers together in any one of a variety of line patterns.

Therefore, it is an object of the present invention to provide a method for forming laminated cellulosic fiber sheet material having improved flexibility, adsorbency and bulk by means of a unitary process.

It is an additional object of this invention to provide a laminated cellulosic fiber sheet material having an inner layer of thermoplastic sheet material which laminated sheet has high surface absorbency and yet which is impervious to moisture, while retaining good flexibility.

Figure 1:
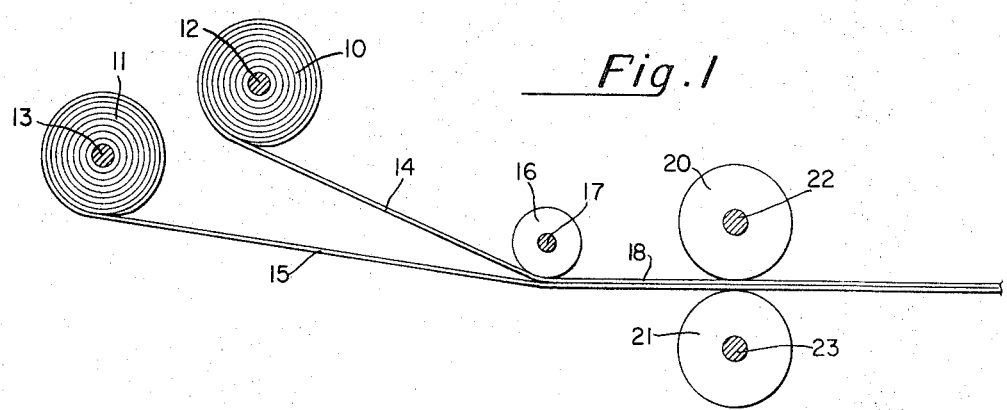
Figure 2:
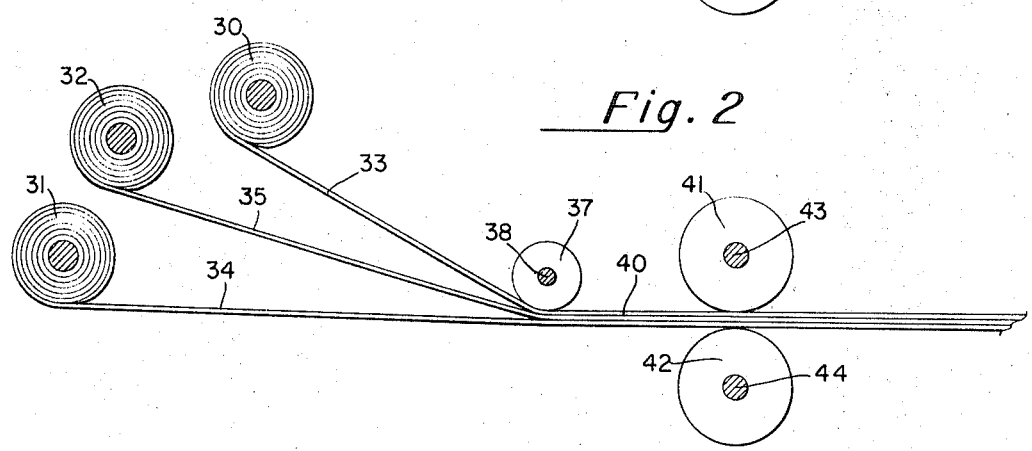
Figure 3:
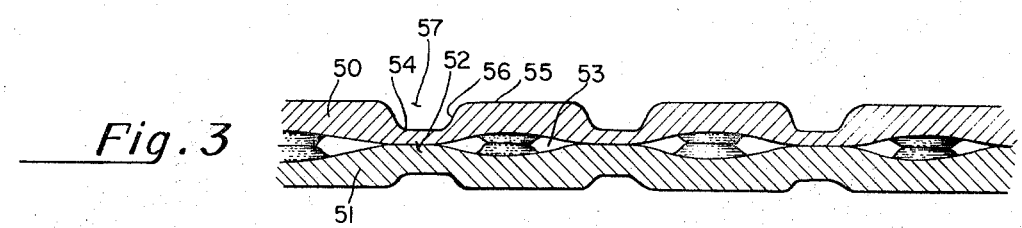
Figure 4:
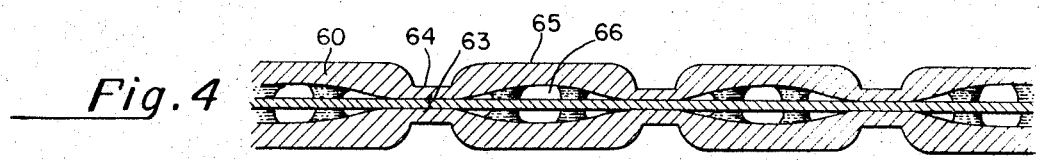
Figure 5:
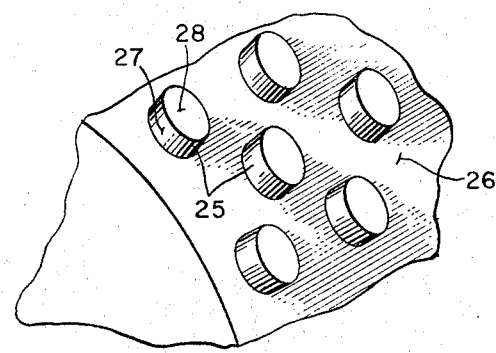

Additional objects and advantages of the invention will be apparent from the following detailed description thereof taken in view of the drawings in which:

FIG. 1 is a schematic view of apparatus capable of performing the method of the invention, FIG. 2 is a schematic view of apparatus capable of performing another embodiment of the invention, FIG. 3 is an enlarged cross-sectional view of one type of laminated material formed in accordance with the invention, FIG. 4 is a cross-sectional view of another type of material formed in accordance with the invention, and FIG. 5 is an enlarged segmented view in perspective of the surface of one of the rolls employed in the method of the invention to provide the products shown in FIGS. 3 and 4.

Basically, the method of the present invention comprises bringing at least two layers of thin fibrous sheet material into superimposing and contacting engagement with one another to form a composite multi-layered sheet, and applying heat and pressure to said composite multi-layered sheet at a plurality of substantially uniformly distributed spaced points from at least one side thereof so as to bond the fibrous sheet together only at said spaced points. One manner of performing this method is schematically illustrated in FIG. 1, where two parent rolls 10 and 11 of thin fibrous sheet material are disposed adjacent to one another and rotatably mounted upon spindles 12 and 13, respectively. Flights 14 and 15 of thin fibrous sheet material are unwound from each respective parent roll 10 and 11 and extended outwardly from the rolls and toward each other so as to come into superimposing and contacting engagement with one another adjacent a guide roll 16 rotatably mounted on a spindle 17. The confluence of flights 14 and 15 forms a composite multi-layered sheet 18 which is fed through the nip of a pair of rolls 20 and 21 rotatably mounted on spindles 22 and 23, respectively, wherein bonding together of adjacent layers is accomplished according to the invention.

In one embodiment of the invention, one of the rolls 20 and 21 may be smooth and the other may have a plurality of spaced projections 25 extending outwardly from its cylindrical surface 26 as shown in detail in FIG. 5. Projections 25 may comprise any desired configuration and be arranged in many different patterns including line patterns such as quilting. However, for uniformity and attractiveness, cylindrical projections have been employed, each of which has an upstanding side wall 27 and a relatively flat end surface 28.

The fibrous sheet materials which may be employed successfully in the above-described process illustrated by FIG. 1 are preferably cellulosic sheet materials formed of collulosic fibers, natural or synthetic, which have been treated and formed into sheet products by ordinary well-known paper making techniques and may include various types of non-woven materials as well.

During operation, flights 14 and 15, representing layers of thin fibrous sheet material are unwound from parent rolls 10 and 11 respectively and are brought into superimposing and contacting engagement with each other by the action of guide roll 16 to form a composite sheet 18. Sheet 18 is fed into the nip of rolls 20 and 21 which rolls are arranged to maintain a fixed spacial relationship relative to each other so as to exert the desired amount of pressure on composite sheet 18. Furthermore, at least one of rolls 20 and 21 is heated. As the composite multi-layer sheet 18 passes through the nip of rolls 20 and 21, sufficient pressure and heat are supplied to uniformly distributed spaced points over the surface of the composite sheet to form bonds between the sheets or flights 14 and 15.

It was quite surprising to discover that adequate bonding can be obtained between ordinary sheets of cellulosic fibers or paper without the addition thereto of any type of bonding agent or binder. It is believed that such bonding occurs due to the same forces present in the original papermaking process, that is, that hydrogen bonding occurs between contacting fibers of adjacent webs 14 and 15 and that this is promoted by the application of a relatively large amount of pressure as well as slightly elevated temperatures. In that regard, in this embodiment of the invention, it is preferable that the fibrous sheet materials desired to be bonded together possess a moisture content greater than about 5% on an oven-dry basis since this water is considered necessary to promote the hydrogen bonding between the fibers.

A different embodiment of the method of the invention is illustrated in FIG. 2 wherein parent rolls 30 and 31 of thin fibrous web material are spaced apart and a parent roll 32 of a thin sheet of thermoplastic material is positioned therebetween. Flights 33, 34 and 35 leading from each of the above rolls, respectively, move into superimposing and contacting engagement with one another at a point adjacent to a guide roll 37 rotatably mounted on a spindle 38 to form a composite multi-layered sheet 40. Sheet 40 has an inner layer of thermoplastic material and an outer layer of thin fibrous sheet material and is fed into the nip of two rolls 41 and 42 rotatably mounted on spindles 43 and 44, respectively, wherein bonding together of adjacent layers is accomplished according to the invention.

Subject to the same conditions as the system shown in FIG. 1, one of the rolls 41 and 42 may be smooth and the other may have a plurality of substantially uniformly distributed spaced projections upon its surface. Also, both of the rolls 41 and 42 might have a plurality of substantially uniformly spaced projections upon their surfaces. In this instance, it would be preferable to have the rolls aligned so that projections upon one roll would coincide with respective projections upon the opposite rolls.

To perform this method in accordance with the operation schematically illustrated by FIG. 2, flights 33, 34 and 35, representing at least one layer of thermoplastic sheet material disposed between two adjacent layers of fibrous sheet material, are unwound from parent rolls 31 and 32, respectively, and are brought together into superimposing and contacting engagement with one another as by the action of guide roll 37 to form a composite multi-layed sheet 40. As in the previous process, sheet 40 is fed into the nip of a pair of rolls 41 and 42 which similarly are arranged to maintain a fixed spacial relationship relative to one another. Again at least one of rolls 41 and 42 is heated. In this process, bonding occurs due to both migration of thermoplastic material under heat and pressure into the fibrous web as well as the embedding of fibers from the fibrous sheet material into the thermoplastic layer. The moisture content of the layers of fibrous sheet material is not significant or important in this embodiment of the invention. Where thermoplastic material is involved and the resulting laminated product is desired to be impervious to moisture, the thermoplastic flow must be such that breaks or holes are not created by the bonding process. This principle is a function of pressure and temperature relationship as well as the physical properties of the thermoplastic material.

The particular conditions of temperature and pressure required for the performance of the method of the invention will vary somewhat depending upon the nature of the particular sheet materials employed as well as other factors such as the number of layers, the relative thickness of each layer, etc. However, it has been found that a pressure of greater than about 1500 p.s.i. is preferable to insure good bonding characteristics between several plies of ordinary thickness. In addition, it has been found that the material should be subjected to a temperature of from about 200° F. to about 400° F. in order to effect adequate bonding whether between adjacent sheets of cellulosic fiber sheet material or between such sheets and a separating layer of thermoplastic material.

As pointed out previously, one of the desirable features of the laminated materials of the present invention is that a large amount of flexibility is retained in the laminated material. In order to retain such flexibility, it has been found preferably to employ bonding areas of a size of from about .0005 to about .002 square inch per bonding area. Equally as important, if not more so, is the spacing of the bonding areas employed. Although laminated materials can be formed by employing bonding areas in a particular line pattern such as a quilted or cross-hatched pattern, maximum flexibility along with a retention of other desirable properties such as maximum absorbency seems to be obtained by employing a pattern of uniformly spaced circular bonding areas which collectively comprise from about 5% to about 20% of the total area of a laminated sheet.

The materials satisfactory for use in the process described in FIG. 2 include any type of thin fibrous sheet material such as cellulosic fiber materials like paper or might also include woven fibers such as cotton, shoddy, wool, jute or any other desired fibrous material whether natural or synthetic. The layer of thermoplastic material 35 might be any type of thermoplastic material which will melt and flow at temperatures below the disintegrating temperatures of the adjacent fibrous webs, such as polyethylene, polyvinyl chloride, etc., and, furthermore, might be fabric coated with a thermoplastic material as in the case of nonwoven materials.

FIGS. 3 and 4 illustrate in slightly exaggerated cross-sectional view features of several embodiments of the material products formed by each of the methods described above. FIG. 3 shows two layers 50 and 51 of cellulosic sheet material bonded together at a plurality of substantially uniformly distributed spaced bonded areas designated generally by 52. It can be seen that the area generally between two adjacent bonding areas comprises a cavity 53 between the adjacent webs 50 and 51 or region where the composite material is relatively uncompressed. The outside surface 54 of each of said bonded areas is inwardly recessed from the outside surface 55 of said sheet material. The formation of each bonding area therefore, results in the formation of a plurality of depressions, which may have inwardly sloping sides but at least the outward lip of which is rounded off. In FIG. 3, each of the bonded areas 54 is substantially round and the sides of 56 of the resulting depression 57 slope inwardly from outside surface 55 to abut surface 54 of the bonding areas.

The shape and distribution of these inwardly depressed bonding areas has a substantial effect on the texture of the resulting laminated material as well as the flexibility. The variety of possibilities is readily apparent but all of the effects which can be simulated or achieved are too numerous to set forth here in detail. The principles are apparent. For example, to provide a material having greater flexibility in one direction than another, the shape of the cavities could be such that the cavity walls do not act as structural members in that direction as much as in the second direction. This could be accomplished with rectangular bonding area depressions having their longitudinal axis perpendicular to the desired direction of greatest flexibility. Similarly, the distribution of such bonding area depressions could be arranged to cause a similar effect.

Other bonding areas can be observed through cavity 53 illustrating more clearly the nature of construction of material products of the invention. It should be pointed out that the views shown in FIGS. 3 and 4 have been exaggerated to illustrate the construction of the products and that, in reality, the cavity 53 will likely be reduced in size or almost nonexistent due to swelling of the cellulosic fiber material following the application of heat and compressive forces at spaced points. However, this will depend in part upon the thickness of the layers 50 and 51 and upon the distance between bonding areas 54. The present figures do illustrate that the material in those regions will be relatively uncompressed and possess high absorptivity in any event and thus, areas do simulate cavities in that respect.

The sheet material shown in FIG. 3 was formed by means of one smooth roll and one roll having a plurality of projections resulting in inwardly recessed bonding areas on each side of the composite sheet. The outside surface of the bonding areas on one side is inwardly recessed further from the outside surface of the sheet than is the case on the opposite side. This results in a composite sheet product having a more pronounced pattern on one side than on the other. The reason that inwardly recessed bonding areas occur on the side formed by sheet 51 seems to be that under such conditions of heat and pressure, the fibers are more closely pressed together in the bonding areas and upon release of the pressure they tend to be pulled inwardly toward sheet 50.

FIG. 4 illustrates in cross-sectional view an embodiment of another type of product which may be formed by the method of the invention described in FIG. 2. Two sheets 60 and 61 are separated by a sheet 62 of thermoplastic material, these three sheets are bonded together at a plurality of substantially uniformly distributed spaced bonding areas designated generally as 63. In this case, the bonding areas are formed when the heat and pressure exerted by the rolls cause the thermoplastic material to flow into the fibrous webs while at the same time compressing the fibrous webs 60 and 61 so as to form small spots of highly compacted solidified fibrous thermoplastic material mix. Upon cooling, this results in the outer surface 64 of the bonding area 63 being inwardly recessed from the outside surface 65 of the sheet material 60.

The material shown in FIG. 4 was formed by two rolls each having matching projections from their surface and arranged to coincide with one another during formation of the product shown in FIG. 4. Therefore, the bonding areas are equally recessed into each side of the composite sheet. In a manner similar to FIG. 3, cavities 66 are present between adjacent bonding areas separating thermoplastic sheets 62 from fibrous webs 60 and 61. As pointed out above, these may be areas where the fibrous material is relatively uncompressed rather than actual cavities. This fact provides increased absorbency since the bulk of the resulting product is increased.

From the above, it can be seen that the invention provides several embodiments of laminated sheet material and a method for forming such material. It will be obvious to one skilled in the art that a large variety of laminated sheet products can be fabricated in accordance with the principles of the invention without departing from the scope thereof. For example, a plurality of layers of thermoplastic material could be interspersed between a plurality of adjacent layers of thin fibrous sheet material and by applying sufficient heat and pressure to cause the thermoplastic material in the interior to flow into adjacent fibrous webs, variations of laminated sheet material could be formed which have not been described in detail in the above description.

What is claimed is:
1. The method of making laminated sheet material having a texture effect and at least two thin sheets of cellulosic fiber material, comprising feeding substantially continuous flights of cellulosic fiber sheet material into contacting engagement in face-to-face superimposing relationship with one another to form a composite multi-layered sheet, said fibrous sheet material having a moisture content of greater than about 5% on an oven-dry basis, introducing said composite multi-layered sheet into the nip of a pair of coacting rolls, at least one of said rolls having a plurality of substantially uniformly raised projections and at least one of said rolls being heated to a temperature of from about 200 to about 400° F. and applying heat and pressure to said composite multi-layered sheet by means of said rolls at a plurality of substantially uniformly distributed spaced areas and from at least one side of said composite multi-layered sheet, said heat and pressure being sufficient to bond said sheets of cellulosic fiber material to each other only at said spaced areas, each of said spaced areas having an area of from about .0005 to about .002 square inch, said pressure being greater than about 1500 p.s.i., and the combined area of said plurality of substantially uniformly distributed spaced areas comprising from about 5 to about 20% of the total area of said sheet.

2. The method of making laminated sheet material having a texture effect and at least one uninterrupted interior layer of thermoplastic sheet material and exterior layers of at least one thickness of thin fibrous sheet material, comprising feeding a substantially continuous flight of said layer of thermoplastic sheet material between a pair of substantially continuous flights of said layers of fibrous sheet material, moving said flights into contacting engagement in face-to-face superimposing relationship with one another to form a composite multi-layered sheet, introducing said composite multi-layered sheet into the nip of a pair of coacting rolls, at least one of said rolls having a plurality of substantially uniformly raised projections and at least one of said rolls being heated to a temperature of from about 200 to about 400° F., and applying heat and pressure to said composite multi-layered sheet by means of said rolls at a plurality of substantially uniformly distributed spaced areas and from at least one side of said composite multi-layered sheet said heat and pressure being sufficient to bond said layers of fibrous sheet material and thermoplastic material to each other only at said spaced areas, each of said spaced areas having an area of from about .0005 to about .002 square inch, said pressure being greater than about 1500 p.s.i., and the combined area of said plurality of substantially uniformly distributed spaced areas comprising from about 5 to about 20% of the total area of said sheet.

References Cited

UNITED STATES PATENTS

| | | | |
|---|---|---|---|
| 2,020,668 | 11/1935 | Wandel | 156—290 |
| 2,354,248 | 7/1944 | Dreyfus | 161—148 |
| 2,880,111 | 3/1959 | Drelich et al. | 161—148 |
| 2,897,109 | 7/1959 | Voigtman | 161—148 |
| 3,215,589 | 11/1965 | Heller et al. | 161—268 |
| 3,249,482 | 5/1966 | Gilfillan | 156—324 |
| 3,377,224 | 4/1968 | Gresham et al. | 156—209 |

MORRIS SUSSMAN, Primary Examiner

U.S. Cl. X.R.

161—116, 148